United States Patent

Moroney

[15] 3,681,697

[45] Aug. 1, 1972

[54] WIDEBAND IMAGE TERMINATED MIXER

[72] Inventor: John E. Moroney, Catonsville, Md.

[73] Assignee: Westinghouse Electric Corporation, Pittsburgh, Pa.

[22] Filed: Dec. 31, 1969

[21] Appl. No.: 889,515

[52] U.S. Cl. ..................325/446, 325/435, 325/449, 332/48

[51] Int. Cl. ..............................................H04b 1/26

[58] Field of Search......325/431, 434, 435, 437, 445, 325/446, 388, 432, 433, 449; 332/44, 48

[56] References Cited

UNITED STATES PATENTS

| | | | |
|---|---|---|---|
| 3,159,790 | 12/1964 | Pratt | 325/449 |
| 2,772,350 | 11/1956 | Deardorff | 325/431 X |
| 3,070,747 | 12/1962 | Addleman | 325/437 |
| 3,515,993 | 6/1970 | Merriam | 325/446 |

*Primary Examiner*—Benedict V. Safourek
*Attorney*—F. H. Henson, E. P. Klipfel and J. L. Wiegreffe

[57] ABSTRACT

Described is a wideband image terminated mixer of the type in which an input signal is split into two parts which are fed to separate mixers supplied with local oscillations from a single oscillator. After mixing, the resultant intermediate frequency signals at the outputs of the mixers are combined. The invention is characterized in that the image frequency signals returning from the mixers in the signal paths are summed at an image termination having a reactance such that the incident image frequency signals reflect back to the mixer where mixing with the local oscillator frequency converts at least portion of the image energy to the intermediate frequency. This reduces insertion losses and allows the image to be terminated over at least a 10 percent radio frequency bandwidth using a standard intermediate frequency such as 30 megahertz.

3 Claims, 4 Drawing Figures

INVENTOR.
JOHN E. MORONEY
BY [signature]
ATTORNEY

INVENTOR.
JOHN. E. MORONEY
BY [signature]
ATTORNEY

WIDEBAND IMAGE TERMINATED MIXER

BACKGROUND OF THE INVENTION

As is known, the intermediate frequency of a superheterodyne receiver is formed when an incoming radio frequency signal is mixed with a local oscillator signal. For any given local oscillator frequency, there are two radio frequency inputs that will produce a desired intermediate frequency, but only one of the inputs will be the frequency to which the receiver is supposedly tuned. The other will be an image frequency separated from the desired signal by twice the intermediate frequency.

Further, when an input signal is mixed with a local oscillator signal in a balanced mixer, a portion of the signal energy is converted to the image frequency and propagates away from the mixer diodes to the signal input port in a direction opposite to the incoming signal. In the past, this loss of signal energy has been eliminated by the use of filters at the inputs to the mixers.

A reduction is conversion loss of up to 3 db for an ideal mixer whose image port is terminated in an open or short circuit has long been known to be possible. That is, by inserting an extremely narrow band filter in the signal arm of a balanced mixer, and by adjusting the phase length between this filter and the mixer diodes such that the reactance of the filter at the image frequency is transformed to either an open or short circuit at the diodes, the filter will reflect the image frequency energy back to the diodes, thereby recovering this image frequency energy. The insertion loss of the filter, however, adds directly to the mixer noise figure.

Image terminated mixers of the type described above were followed in the prior art with low noise 30 megahertz pre-amplifiers. As a result, the radio frequency bandwidth was never greater than 10 megahertz. That is, the filter passing the signal acts as a short circuit only 60 megahertz away. Such a narrow bandwidth prevents these mixers from being used in any but a few specialized applications. To achieve the wide radio frequency bandwidths needed for most applications, such as frequency agile radar, a much higher intermediate frequency must be used. An accompanying disadvantage with intermediate frequency pre-amplifiers above 60 megahertz is a rapidly increasing noise figure. For mixers using Schottky barrier diodes, an increase in the intermediate frequency noise figure increases the mixer noise figure by the same amount. Image terminated mixers using a narrow band filter will have appreciably lower noise figures only over very narrow radio frequency bandwidths.

SUMMARY OF THE INVENTION

As an overall object, the present invention seeks to provide an image terminated mixer in which the image can be terminated over more than a 10 percent radio frequency bandwidth.

Another object of the invention is to provide a wideband image terminated mixer of the type described having reduced insertion losses.

In accordance with the invention, a signal mixer is provided of the type in which input signal energy is split into a pair of signal paths each containing a balanced mixer coupled to a common local oscillator, and wherein the outputs of the balanced mixers are combined in a hybrid coupler. The apparatus for splitting the signal energy into the aforesaid pair of signal paths is characterized in that it will reflect image frequencies from the balanced mixers back into the input port of the mixers where the image frequency is mixed with the local oscillator frequency to produce an output intermediate frequency without substantial attenuation of the image frequency energy.

In one embodiment of the invention, the apparatus for splitting the wave energy into two signal paths comprises a 180° hybrid having a signal input port, two output ports connected to the respective mixers, and an image termination port. The image voltages propagating backwardly from the mixers to the 180° hybrid are equal and opposite in phase. These image components are summed in the image termination of the 180° hybrid and then reflected back to the mixers with the desired phase and without any substantial attenuation such that the image frequency is now mixed with the local oscillator frequency to produce an output intermediate frequency.

In another embodiment of the invention, the apparatus for splitting the wave energy into the aforesaid pair of signal paths comprises a power divider which, like the 180° hybrid, reflects the image frequencies back to the balanced mixers with the correct phase such that they are mixed with the local oscillator frequency to produce an output intermediate frequency.

The above and other objects and features of the invention will become apparent from the following detailed description taken in connection with the accompanying drawings which form a part of this specification, and in which.

Figure 1:
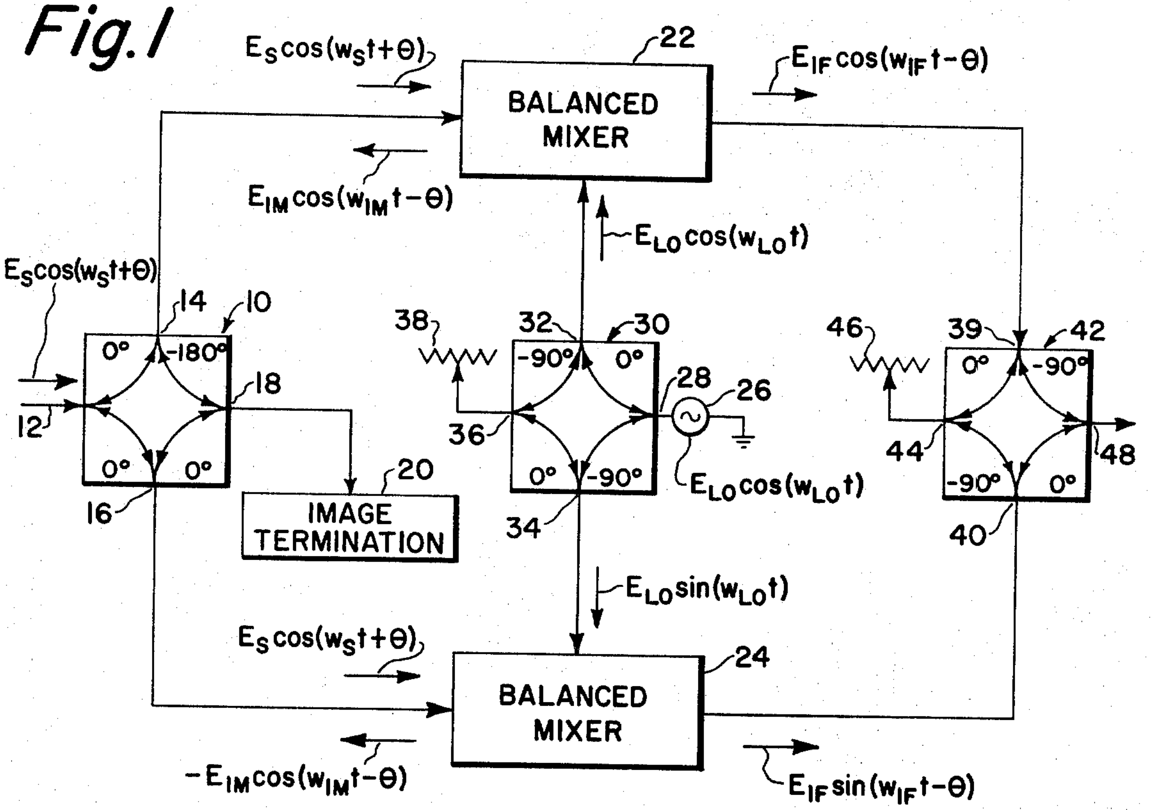
FIG. 1 is a schematic circuit diagram of one embodiment of the invention.

With reference now to the drawings, and particularly to FIG. 1, the apparatus shown includes an input 180° hybrid 10 having an input port 12 and two signal output ports 14 and 16. The 180° hybrid 10 includes a fourth port 18 connected to an image termination 20.

The port 14 is connected to the input port of a first balanced mixer 22; while port 16 is connected to the input port of a second balanced mixer 24. In passing from input port 12 to either one of output ports 14 or 16, the incident signal $E_s \cos(\omega_s t + \theta)$ was not shifted in phase. A 180° phase shift, however, is experienced in wave energy passing from port 14 to port 18, or vice versa.

The system includes a local oscillator 26 which produces an output signal $E_{LO} \cos(\omega_{LO} t)$. This wave energy is applied to an input port 28 of a quadrature hybrid 30 having three output ports 32, 34 and 36. Port 36 is connected to a matched load 38 as shown. Wave energy, in passing from port 28 to port 32 experiences no phase shift; whereas it experiences a minus 90° phase shift in passing from port 28 to port 34. Consequently, the local oscillator signal applied to the balanced mixer 22 is $E_{LO} \cos(\omega_{LO}t)$, which has the same phase relationship as the output of the oscillator 26; while the signal applied to the balanced mixer 24 is $E_{LO} \sin(\omega_{LO}t)$.

The output intermediate frequency from the balanced mixer 22 is $E_{IF} \cos(\omega_{IF}t - \theta)$; while the output intermediate frequency from balanced mixer 24 is $E_{IF} \sin(\omega_{IF}t - \theta)$. Consequently, the two intermediate frequencies at the outputs of the balanced mixers 22 and 24 are 90° out of phase with respect to each other. These two signals are applied to two ports 39 and 40 of an intermediate frequency quadrature hybrid 42. Hybrid 42 includes port 44 connected to a matched load 46, and an output port 48. The wave energy in passing from port 39 to port 48 is shifted in phase by minus 90°; but that passing from port 40 to port 48 is not shifted in phase. Consequently, the two intermediate frequency outputs of the balanced mixers 22 and 24 are combined at port 48 with the same phase and comprise the output intermediate frequency.

Figure 2:
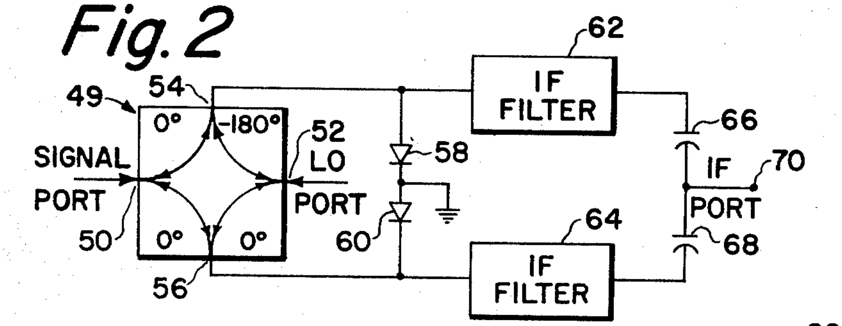
FIG. 2 is a schematic circuit diagram of one balanced mixer which can be used in the system of FIG. 1.

One type of balanced mixer which can be used in the circuit of FIG. 1 is shown in FIG. 2. It includes an input hybrid 49 having a signal input port 50, a local oscillator input port 52 and two output ports 54 and 56 connected through diodes 58 and 60, respectively, to ground. The ports 54 and 56 are also connected through intermediate frequency filters 62 and 64, respectively, and capacitors 66 and 68, respectively, to an output intermediate frequency port 70. Wave energy, in passing from port 52 to port 54, is shifted in phase by minus 180°; while that passing from port 52 to port 56 is not shifted in phase. Consequently, the intermediate frequency signal applied to the anode of diode 58 is 180° out of phase with respect to that applied to the cathode of diode 60.

Figure 3:
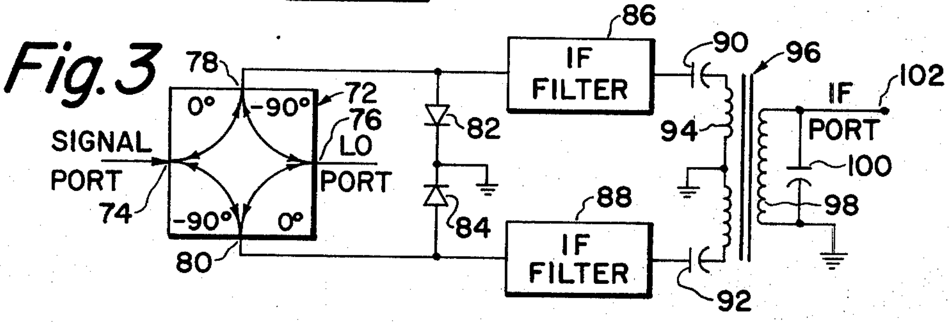
FIG. 3 is a schematic circuit diagram of another type of balanced mixer which can be used in the system of FIG. 1.

Another type of balanced mixer which can be used in accordance with the present invention is shown in FIG. 3. It again includes an input hybrid 72 having a signal input port 74 and a local oscillator input port 76, together with two output ports 78 and 80. Wave energy, in passing between input port 74 and port 80 is shifted in phase by minus 90°. Similarly, the local oscillator wave energy passing from port 76 to port 78 is shifted in phase by minus 90°. Port 78 is connected to ground through diode 82; while port 80 is connected to ground through diode 84. The anodes of both diodes 82 and 84 are connected through intermediate frequency filters 86 and 88, respectively, and capacitors 90 and 92, respectively, to the opposite ends of a center-tapped primary winding 94 of output transformer 96. The secondary winding 98 of transformer 96 is in shunt with capacitor 100, one end of the secondary winding 98 being grounded and the other comprising the output intermediate frequency port 102.

The wideband microwave mixers of the type shown in FIGS. 2 and 3 where the intermediate frequency is less than 5% of the signal frequency, a condition exists where the mixer diode sees the same resistive termination at the signal frequency and the image frequency. Minimum theoretical conversion loss for this mixer is then 3 db. This results from the fact that the ideal mixer is a reciprocal network, meaning that the conversion loss from the signal port to the intermediate frequency port equals the conversion loss from the intermediate frequency port to the signal port. If the resistive termination at the image frequency is eliminated, no energy at this frequency will be dissipated and the conversion loss of the ideal mixer will be zero. In the past, this has been accomplished by using a narrow band filter; however, as mentioned above, this dissipates energy and reduces the band-width of the mixer severely.

In FIG. 1, the image frequency reflected backwardly from the balanced mixer 22 is represented as $E_{IM} \cos(\omega_{IM}t - \theta)$; while the image frequency reflected from mixer 24 is represented as $-E_{IM} \cos(\omega_{IM}t - \theta)$. Thus, the image voltages from the two balanced mixers are equal and opposite in phase. The image signal from balanced mixer 22, in passing from port 14 to port 18 of hybrid 10, is shifted in phase by 180°. Consequently, the reflected image energy as seen by the image termination 20 is all of the same phase. The termination 20 is reactive and completely reflects any incident energy. It will usually be a short or open circuit; although any inductive or capacitive value will suffice. When this energy is reflected back to the balanced mixers 22 and 24, it is again mixed with the local oscillator frequency from hybrid 30 to produce the desired intermediate output frequency.

In any image terminated mixer of the type shown herein, the phase of the returning image energy to the diodes in the mixer relative to the phase of the image energy leaving the diode is important to the operation of the image terminated mixer. The reason for this is the sensitivity of the mixer intermediate frequency impedance to the phase of the returned image energy. An intermediate frequency amplifier connected to the output of the mixer of FIG. 1 has a minimum noise figure for a narrow range of mixer intermediate impedances. As a result, the value of the image termination reactance as well as the phase length of the separation between the termination and the mixer diodes must be controlled by the design and mechanization of the image terminated mixer. These changes in mixer intermediate frequency impedance result from changes in operation frequency of the mixer since the phase length separating the termination and the mixer diode changes as frequency changes. The effective changes in intermediate frequency impedance can be compensated for by electronically varying the transforming ratio of an LC matching network as the local oscillator frequency changes. For this type of compensation, a bandwidth of 100 percent is feasible — without compensation a bandwidth of more than 10 percent is feasible.

As an actual example, let us assume that the signal frequency applied to an input port 12 in FIG. 1 is 10,000 megahertz and that the frequency generated by the local oscillator 26 is 10,030 megahertz. In the mixers 22 and 24, the sum and difference of the input signal frequency and the intermediate frequency will be produced. The filters in the mixers are tuned to 30 megahertz and, consequently, the output intermediate frequency signal will have a frequency of 30 megahertz.

The image frequency reflected backwardly from the balanced mixers 22 and 24 to the image termination 20 will have a frequency of 10,060 megahertz. When these image signals are reflected back to the balanced mixers 22 and 24, they are again mixed with the local oscillator signals, producing the intermediate frequency of 30 megahertz which passes to the output via hybrid 42. Hence, the reflected image frequency, which was previously dissipated in a filter connected to the signal input port, if reflected back into the mixer where it is again mixed with the local oscillator frequency to produce the desired intermediate frequency.

Figure 4:
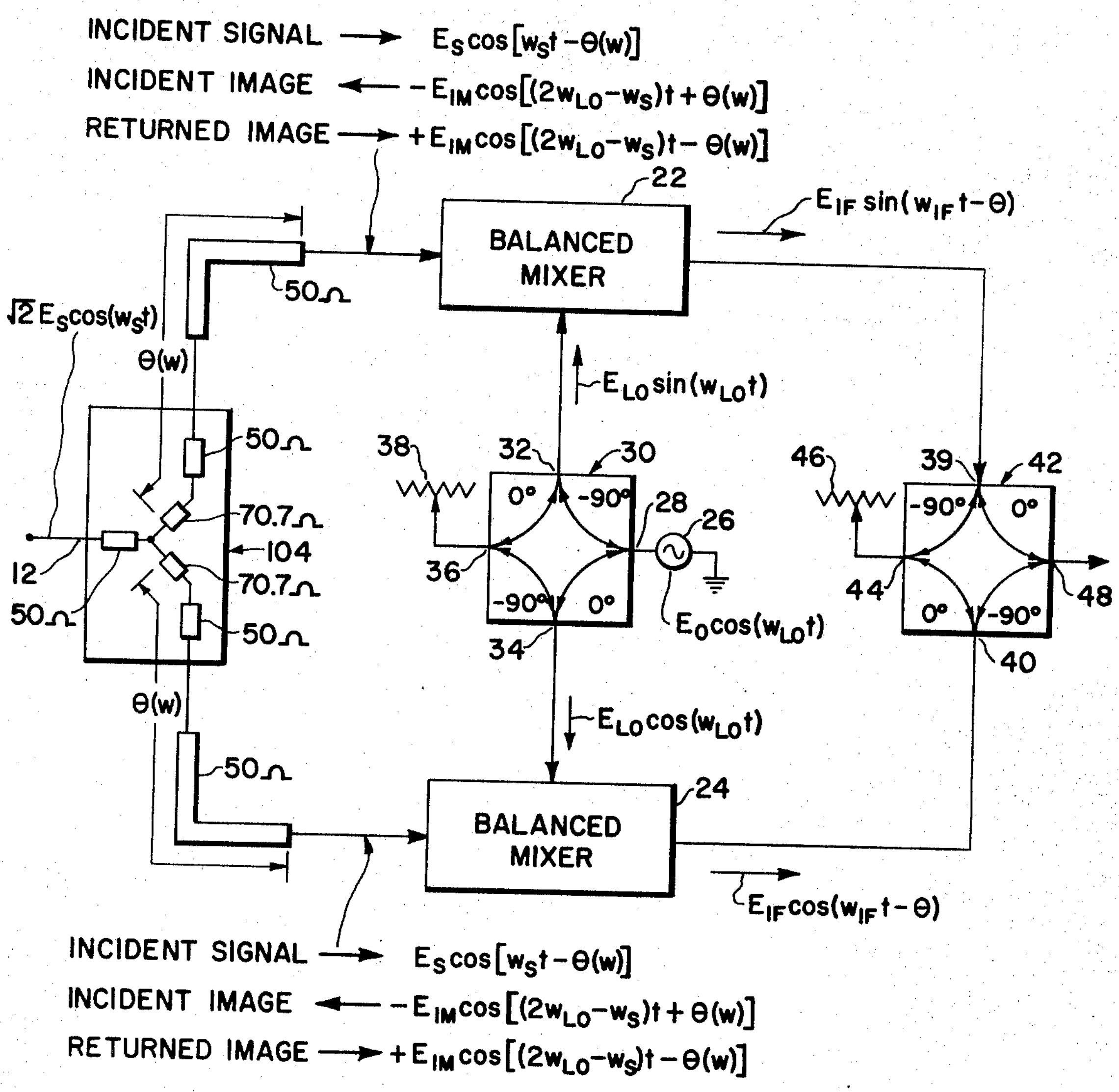
FIG. 4 is a schematic circuit diagram of another embodiment of the invention employing an input power divider rather than a 180° hybrid as in the embodiment of FIG. 1.

In FIG. 4, another embodiment of the invention is shown which is similar to that which is shown in FIG. 1, except that the input 180° hybrid is replaced by a power divider 104. Elements in FIG. 4 which correspond to those shown in FIG. 1 are identified by like reference numerals. In this case, the image signals leaving the balanced mixers reach the junction of the power divider with equal amplitude and opposite phase. The junction, therefore, appears as a short circuit to the image frequency signals, resulting in complete reflection of the image signals back to the mixer diodes. The phase of the returning image is a function of frequency and depends upon the phase length of the interconnecting transmission line.

The present invention thus provides an image terminated mixer which permits the advantages of this type of mixer to be realized over more than a 10 percent radio frequency bandwidth where previously, less than a 1 percent bandwidth was feasible. The only limitation on the bandwidth over which the noise figure improvement may be obtained is the characteristics of the radio frequency networks such as diode matching networks, radio frequency hybrids and constant phase shift networks. Image rejection mixers which have nearly identical broadband phasing problems, are capable of 25 db of image rejection over a 10 percent radio frequency bandwidth. This broadband phasing capability may be extended to the image terminated mixer in determining a bandwidth capability.

In comparison with a conventional mixer, a noise figure improvement of 2 db may be expected for the image terminated mixer using the phasing techniques of the present invention. Both mixers use low noise figure Schottky barrier diodes. At X-band, then, using diodes with a rated db noise figure, a system noise figure of 4.0 db is possible using the wideband image terminated mixer of the invention and a 30 megahertz pre-amplifier with a 1.5 db noise figure. The radio frequency bandwidth of this system would be 1 Ghz.

Although the invention has been shown in connection with certain specific embodiments, it will readily be apparent to those skilled in the art that various changes in form and arrangement of parts may be made to suit requirements without departing from the spirit and scope of the invention.

I claim as my invention:

1. A wideband image enhancement mixer system comprising, microwave coupling means having at least three ports, one of said ports of said coupling means serving as an input signal port and two of said ports serving as output signal ports for dividing an incoming signal between two signal paths, microwave transmission lines connecting said two output ports, respectively, with two balanced mixers, a local oscillator, a first 90° hybrid coupler having one of its ports connected to the output of said oscillator and having two ports serving as outputs connected respectively, to each of said mixers and a fourth port connected to a matched load impedance, a second 90° hybrid microwave junction having two ports connected, respectively, to the outputs of said mixers and two other ports, one of which is connected to a matched load and the other of which constitutes a signal output, whereby the resultant intermediate frequency signals at the outputs of said mixers are combined and the image frequency signals returning from said mixers are summed image termination and reflected back to said mixers to convert at least a portion of the image frequency signal energy to intermediate frequency energy.

2. The combination as set forth in claim 1 in which said coupling means is a 180° microwave hybrid junction having a fourth port connected to a terminating impedance.

3. The combination as set forth in claim 1 in which said first means is a power divider.

* * * * *